(12) United States Patent
Hsieh

(10) Patent No.: US 7,824,094 B2
(45) Date of Patent: *Nov. 2, 2010

(54) BACKLIGHT MODULE HAVING LIGHT GUIDE PLATE WITH RECESSES

(75) Inventor: Hsiang-Hui Hsieh, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 192 days.

This patent is subject to a terminal disclaimer.

(21) Appl. No.: 11/998,008

(22) Filed: Nov. 27, 2007

(65) Prior Publication Data

US 2008/0123365 A1 May 29, 2008

(30) Foreign Application Priority Data

Nov. 27, 2006 (TW) .............................. 95220883 U

(51) Int. Cl.
*F21V 7/04* (2006.01)
(52) U.S. Cl. ...................... 362/626; 362/623; 362/625; 362/615; 362/613
(58) Field of Classification Search ......... 362/625–626, 362/612, 615, 624; 349/62, 69
See application file for complete search history.

(56) References Cited

U.S. PATENT DOCUMENTS

| 6,068,382 | A | * | 5/2000 | Fukui et al. | 362/625 |
| 6,167,182 | A | * | 12/2000 | Shinohara et al. | 385/129 |
| 6,454,452 | B1 | * | 9/2002 | Sasagawa et al. | 362/561 |
| 6,685,329 | B2 | * | 2/2004 | Kim et al. | 362/626 |
| 6,979,112 | B2 | | 12/2005 | Yu et al. | |
| 7,507,011 | B2 | * | 3/2009 | Ueno et al. | 362/625 |
| 7,517,131 | B2 | * | 4/2009 | Hsieh | 362/625 |
| 2008/0094853 | A1 | * | 4/2008 | Kim et al. | 362/612 |

* cited by examiner

Primary Examiner—Robert J May
(74) Attorney, Agent, or Firm—Wei Te Chung

(57) ABSTRACT

An exemplary backlight module (1) includes a light source (11) and a light guide plate (12). The light guide plate includes a light incident surface (121) to which the light source is placed adjacent, and a bottom surface (122) adjacent the light incident surface. The bottom surface defines a plurality of recesses (1222). Each recess defines a first slant (101) facing the light source and an arris (103) at a top of the first slant. The arris of the first slant at each recess is aligned substantially perpendicular to a main path of light beams that propagate from the light source to the recess.

5 Claims, 10 Drawing Sheets

BACKLIGHT MODULE HAVING LIGHT GUIDE PLATE WITH RECESSES

FIELD OF THE INVENTION

The present invention relates to backlight modules, and particularly to a backlight module having a light guide plate defining a plurality of recesses therein.

GENERAL BACKGROUND

Liquid crystal displays are commonly used as display devices for compact electronic apparatuses. This is because they not only provide good quality images, but also they are very thin. Liquid crystal in a liquid crystal display does not emit any light itself. The liquid crystal requires a light source to display texts or images. Thus a typical liquid crystal display has a backlight module installed therewith.

Referring to FIG. 11, a typical backlight module 9 includes a light guide plate 92, a first diffusing film 93, a first brightness enhancement film (BEF) 94, a second BEF 95, and a second diffusing film 96 disposed in that order from bottom to top. Further, a light source 91 is provided at a side of the light guide plate 92.

Referring also to FIG. 12 and FIG. 13, the light guide plate 92 is essentially rectangular. The light guide plate 92 includes a light incident surface 921 adjacent to the light source 91, a top light emitting surface 923 perpendicularly adjoining the light incident surface 921, a bottom surface 922, and three side surfaces 924 perpendicularly adjoining both the light emitting surface 923 and the bottom surface 922. The bottom surface 922 defines a plurality of grooves 9222. The grooves 9222 are linear and parallel to each other. Each groove 9222 defines an essentially triangular profile.

Light beams emitted from the light source 91 enter the light guide plate 92 through the light incident surface 921. A majority of the light beams travel along generally perpendicular paths relative to the light incident surface 921 before reaching the grooves 9222. These light beams are reflected upward by interfaces of the grooves 9222, transmit out from the light emitting surface 923, and are utilized. A minority of the light beams travel along substantially oblique paths relative to the light incident surface 921 before reaching the grooves 9222. These light beams are reflected sideways by interfaces of the grooves 9222, transmit out from two lateral of the three side surfaces 924, and are not utilized. Accordingly, a light utilization ratio of the backlight module 9 is rather low.

Furthermore, the grooves 9222 all have a same configuration, and a pitch between every two adjacent grooves 9222 is constant. Thus the light beams emitting from the light guide plate 92 are not uniform. In order to output light uniformly, the backlight module 9 needs the two diffusing films 93, 96 and the two BEFs 94, 95. These plural films 93, 96, 94, 95 add to the cost of the backlight module 9, and make the backlight module 9 somewhat thick.

What is needed is an improved backlight module that can overcome the above-described deficiencies.

SUMMARY

In one preferred embodiment, a backlight module includes a light source and a light guide plate. The light guide plate includes a light incident surface to which the light source is placed adjacent, and a bottom surface adjacent the light incident surface. The bottom surface defines a plurality of recesses. Each recess defines a first slant facing the light source and an arris at a top of the first slant. The arris of the first slant at each recess is aligned substantially perpendicular to a main path of light beams that propagate from the light source to the recess.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale. The emphasis is, instead, placed upon clearly illustrating the principles of different embodiments of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
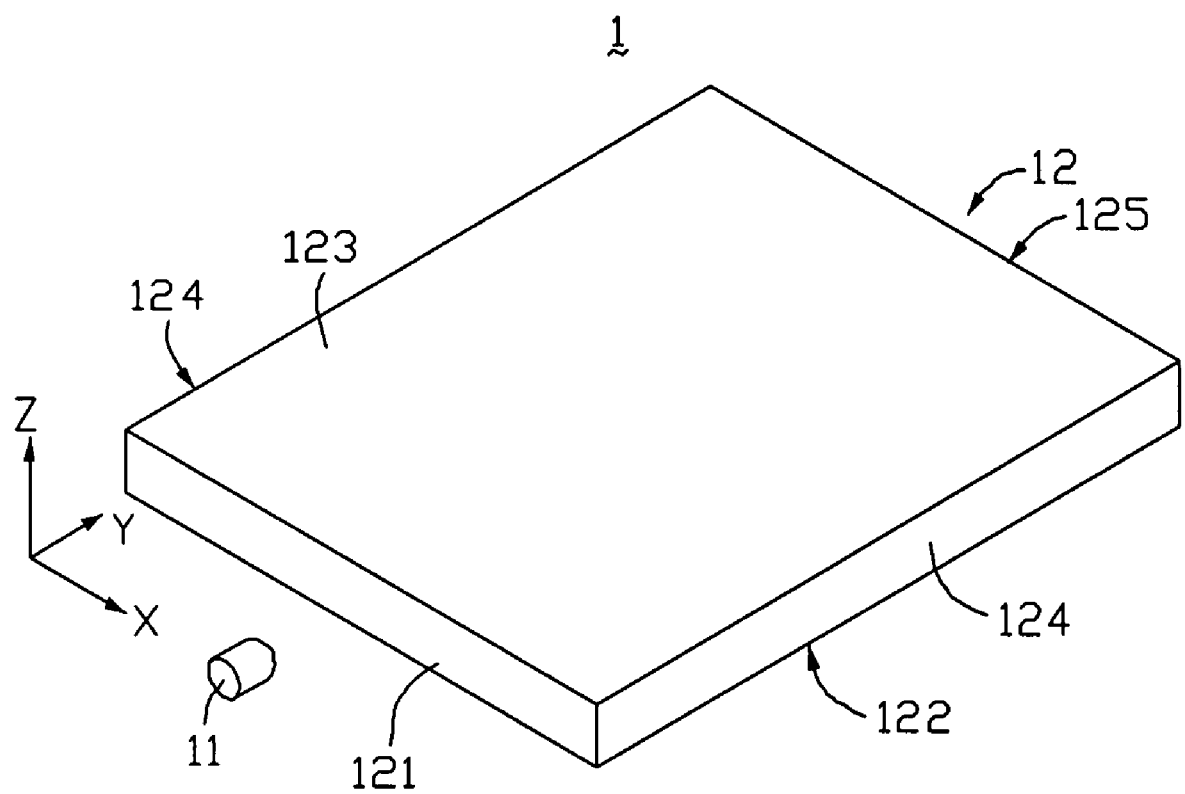
FIG. 1 is an exploded, isometric view of a backlight module according to a first embodiment of the present invention, the backlight module including a light guide plate, the light guide plate including a light incident surface and a light emitting surface, a direction parallel to the light incident surface being defined as an X-direction, a direction perpendicular to the light incident surface being defined as a Y-direction, and a direction perpendicular to the light emitting surface being defined as a Z-direction.

Referring to FIG. 1, a backlight module 1 according to a first embodiment of the present invention is shown. The backlight module 1 includes an essentially rectangular light guide plate 12, and a light source 11. The light guide plate 12 includes a light incident surface 121, a bottom surface 122 perpendicularly adjoining the light incident surface 121, a top light emitting surface 123 adjoining the light incident surface 121, two first side surfaces 124, and a second side surface 125. The first side surfaces 124 are at opposite long sides of the light guide plate 12. The light incident surface 121 and the second side surface 125 are at opposite short sides of the light guide plate 12. The light guide plate 12 can be made from polycarbonate (PC) or polymethyl methacrylate (PMMA). The light source 11 is disposed adjacent to the light incident surface 121. The light source 11 is a point illuminator; for example, a light emitting diode (LED).

Figure 2:
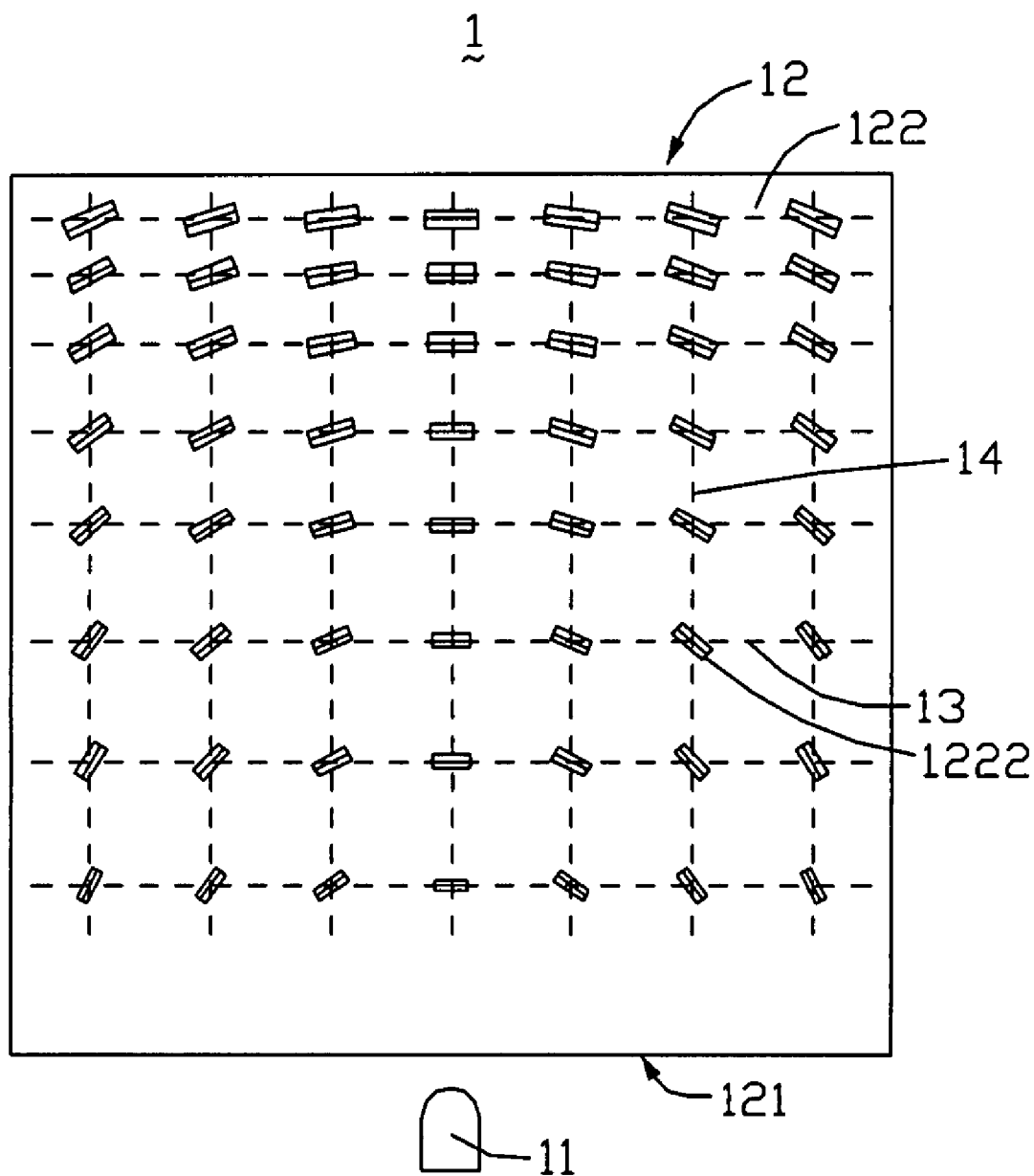
FIG. 2 is an bottom plan view of the backlight module of FIG. 1.

Referring also to FIG. 2, the bottom surface 122 defines a plurality of recesses 1222 arranged in a matrix. The matrix is defined by an imaginary grid of the bottom surface 122. The grid includes a plurality of imaginary first grid lines 13 and a plurality of imaginary second grid lines 14. The first grid lines 13 are parallel to each other and parallel to the light incident surface 121. A pitch between every two adjacent first grid lines 13 progressively decreases with increasing distance away from the light source 11. The second grid lines 14 are parallel to each other and perpendicular to the light incident surface 121. A pitch between every two adjacent second grid lines 14 is constant. The recesses 1222 are arranged at intersections of the first and second grid lines 13, 14.

Figure 3:
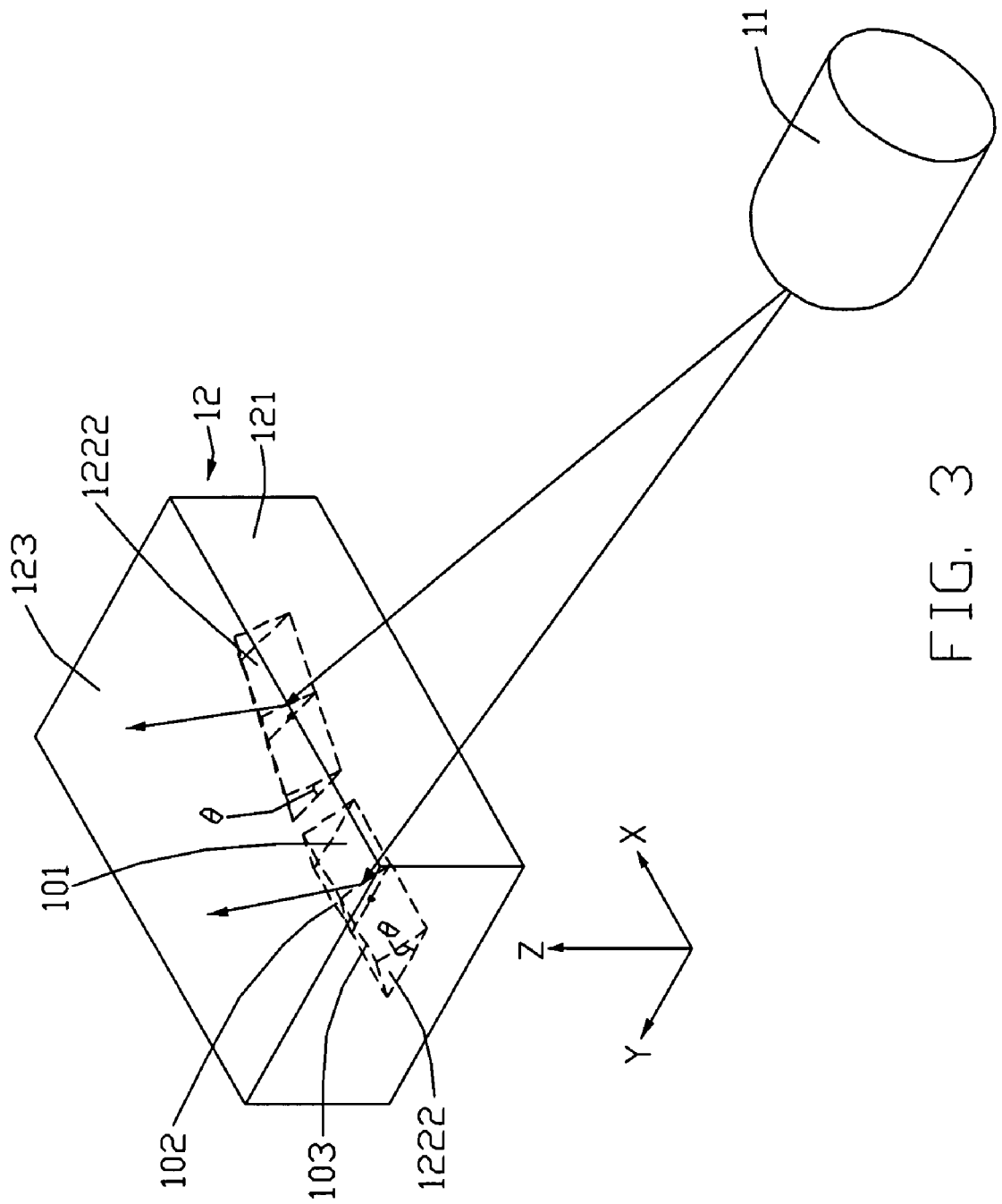
FIG. 3 is an enlarged, isometric view of part of the backlight module of FIG. 1, showing essential optical paths of the light guide plate.

Referring also to FIG. 3, each recess 1222 defines a first rectangular slant 101 and a second rectangular slant 102. The first slant 101 faces substantially toward the light source 11. Each of the slants 101, 102 maintains a base angle (labeled as θ) relative to the bottom surface 122. The base angles are equal to each other. Thus, each recess 1222 defines an essentially isosceles triangular profile. A value of the base angle θ is in the range from 45° to 55°. Furthermore, the two slants 101, 102 intersect with each other and form an arris 103. The arris 103 is aligned substantially perpendicular to a main path of light beams that propagate directly from the light source 11 to the recess 1222. Lengths of the arrises 103 of the recesses 1222 increase with increasing distance away from the light source 11.

Light beams emitted by the light source 11 enter the light guide plate 12 through the light incident surface 121. Because each of the first slants 101 faces substantially toward the light source 11, a majority of light beams reach the recesses 1222 at angles generally perpendicular to the arrises 103. Therefore these light beams are reflected upward in directions generally toward the light emitting surface 123. Few of the light beams are reflected sideways. That is, few of the light beams escape out from the first side surfaces 124. In addition, because the value of the base angle θ is in the range from 45° to 55°, the recesses 1222 reflect an optimal amount of the incident light beams upward, with relatively few light beams being reflected obliquely to the first side surfaces 124.

Furthermore, an intensity of light beams propagating in the light guide plate 12 decreases with increasing distance away from the light incident surface 121. To compensate for this phenomenon, the lengths of the arrises 103 of the recesses 1222 progressively increase with increasing distance away from the light incident surface 121. Accordingly, the intensity of light beams emitting from the light emitting surface 123 of the light guide plate 12 can be substantially uniform.

Figure 4:
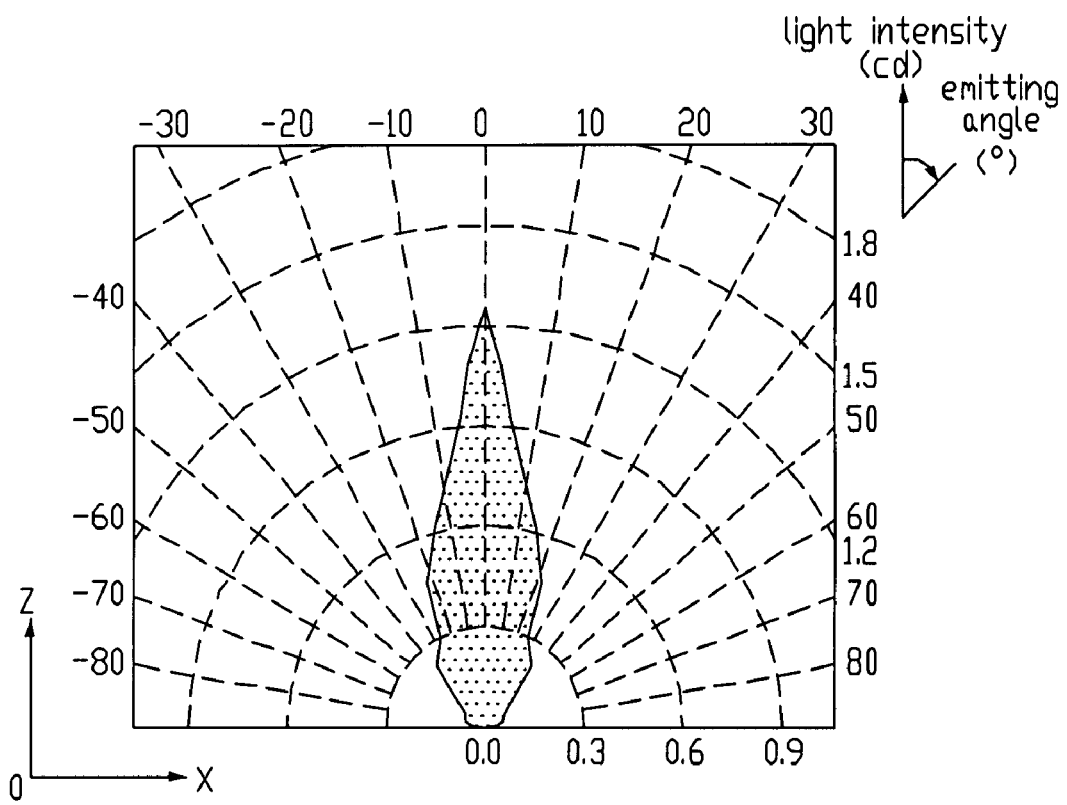
FIG. 4 is a graph showing an experimental simulation of light beam intensity in a Z-X plane of the backlight module of FIG. 1.
Figure 5:
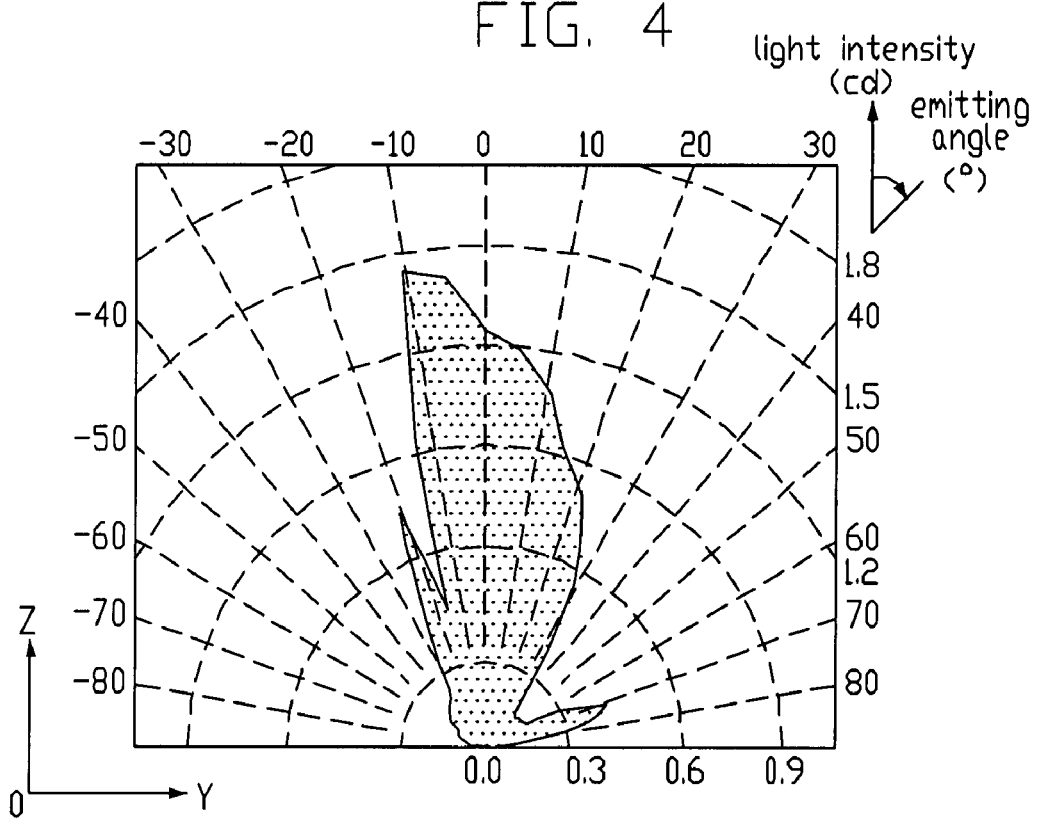
FIG. 5 is a graph showing an experimental simulation of light beam intensity in a Z-Y plane of the backlight module of FIG. 1.

Referring also to FIG. 4 and FIG. 5, experimental simulations indicate that the backlight module 12 can provide high brightness and uniformity of output light beams. In FIG. 4 and FIG. 5, a direction parallel to the light incident surface 121 is defined as an X-direction. A direction perpendicular to the light incident surface 121 is defined as a Y-direction. A direction perpendicular to the light emitting surface 123 is defined as a Z-direction. FIG. 4 shows light beams intensities in different directions in a Z-X plane. FIG. 5 shows light beams intensities in different directions in a Z-Y plane. In each such plane, all the light beams emitting from the light emitting surface 123 are substantially uniform over a desired range of emission angles closest to the perpendicular (0°). Further, all the light beams emitting from the light emitting surface 123 have high brightness over a desired range of emission angles closest to the perpendicular (0°).

Compared with conventional backlight modules, a light utilization ratio of the backlight module 1 is improved, and a brightness of the backlight module 1 is enhanced. Furthermore, in at least some applications, there is no need for any corrective or compensative optical films such as BEFs. In such cases, the backlight module 1 can be efficiently manufactured, and is more compact. Thus, a cost of the backlight module 1 is reduced.

Figure 6:
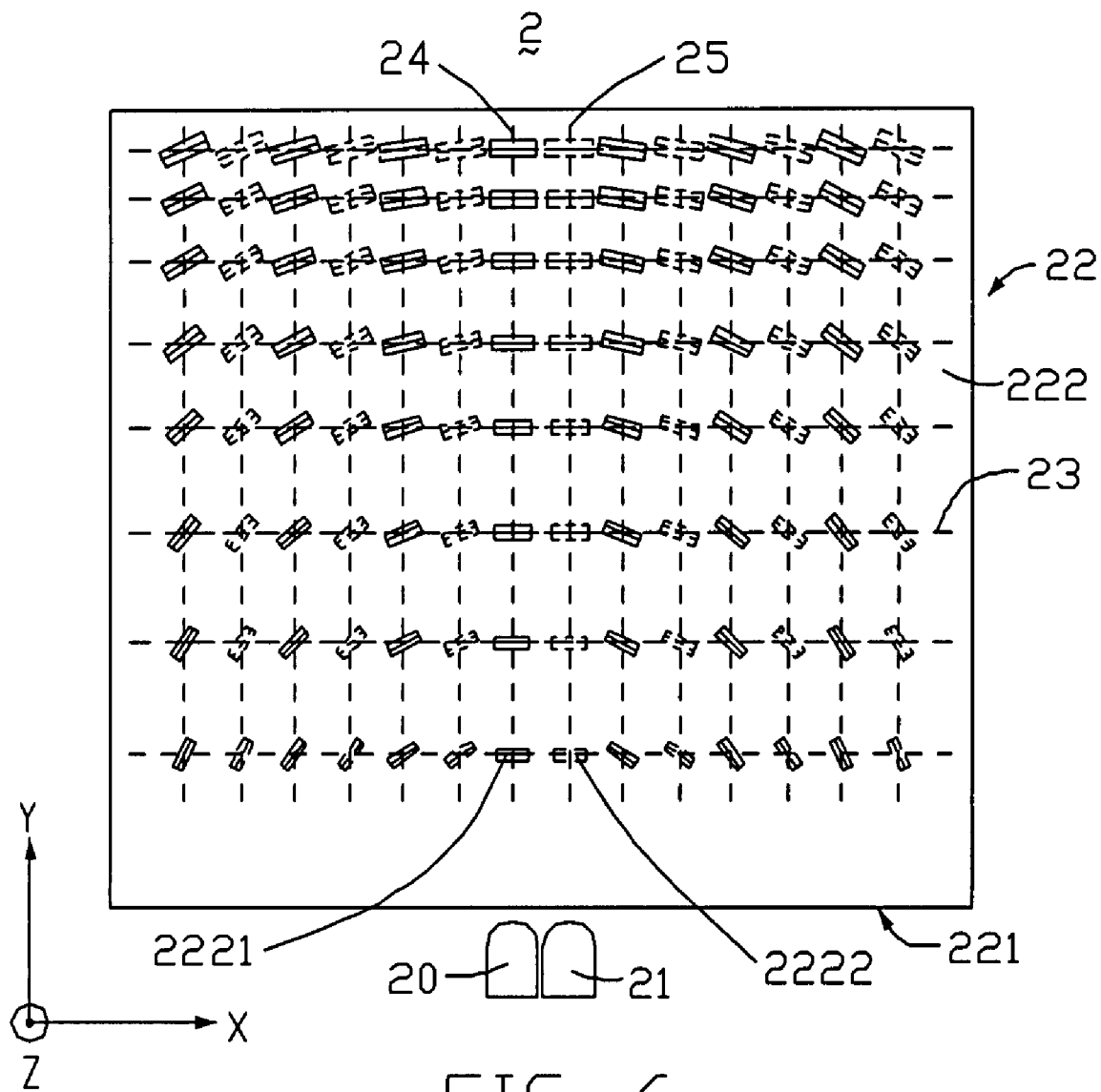
FIG. 6 is a bottom plan view of a backlight module according to a second embodiment of the present invention, the backlight module including a light guide plate, the light guide plate including a light incident surface and a bottom surface, a direction parallel to the light incident surface being defined as an X-direction, a direction perpendicular to the light incident surface being defined as a Y-direction, and a direction perpendicular to the bottom surface being defined as a Z-direction.

Referring to FIG. 6, a backlight module 2 according to a second embodiment of the present invention is similar in principle to the backlight module 1. However, the backlight module 2 includes a first light source 20, a second light source 21, and a light guide plate 22. Each light source 20, 21 is a point illuminator, such as an LED. The two light sources 20, 21 are disposed adjacent to a light incident surface 221 of the light guide plate 22. A bottom surface 222 of the light guide plate 22 defines a group of first recesses 2221 and a group of second recesses 2222.

The bottom surface 222 defines an imaginary grid. The grid includes a plurality of imaginary first grid lines 23, a plurality of imaginary second grid lines 24, and a plurality of imaginary third grid lines 25. The first grid lines 23 are parallel to each other and are parallel to the light incident surface 221. The second grid lines 24 are parallel to each other and are orthogonal to the light incident surface 221. The third grid lines 25 are parallel to each other and are parallel to the second grid lines 24. The second grid lines 24 and the third grid lines 25 are arranged alternately.

Figure 7:
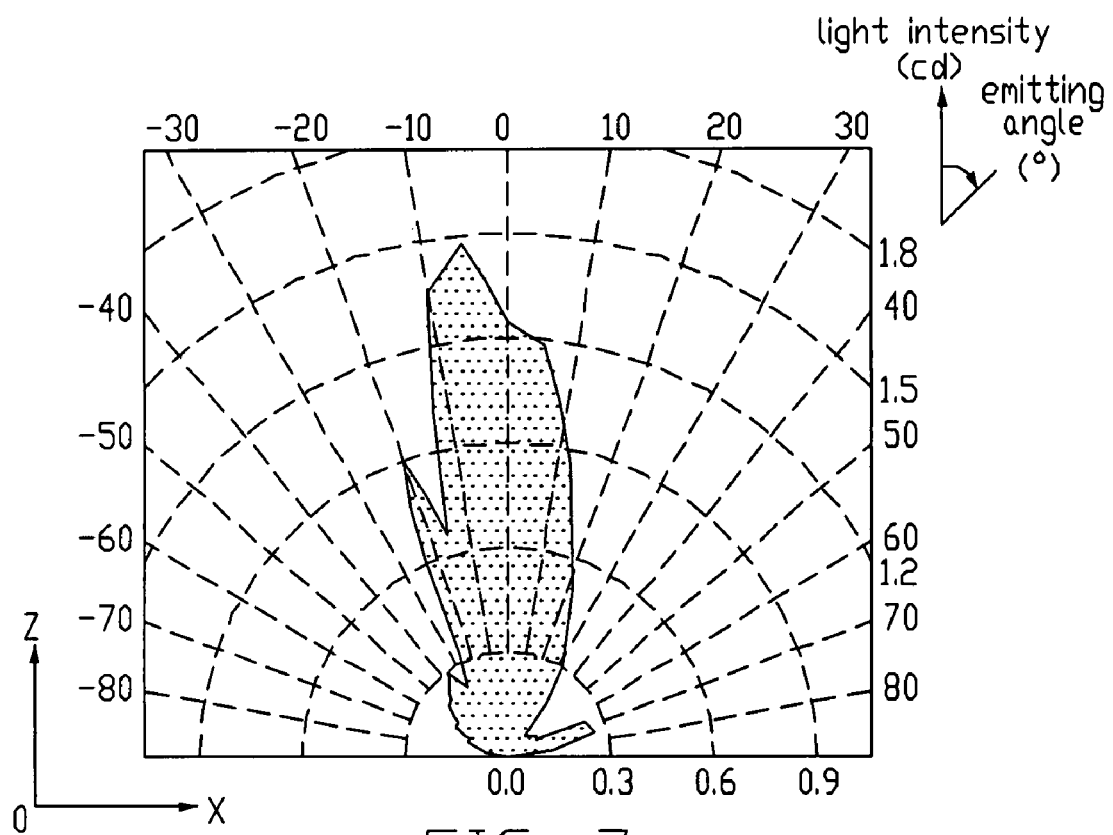
FIG. 7 is a graph showing an experimental simulation of light beam intensity in a Z-X plane of the backlight module of FIG. 6.
Figure 8:
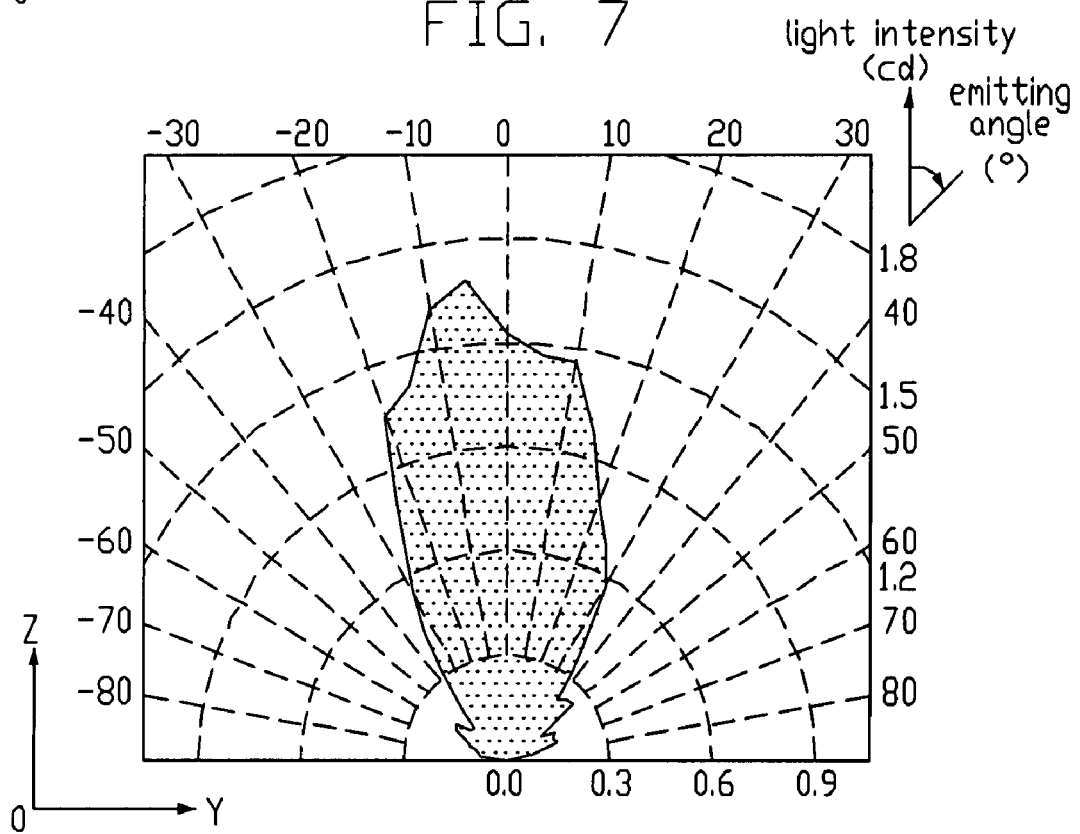
FIG. 8 is a graph showing an experimental simulation of light beam intensity in a Z-Y plane of the backlight module of FIG. 6.

The first recesses 2221 are arranged at intersections of the first grid lines 23 and the second grid lines 24. Each first recess 2221 defines a first slant (not labeled) facing substantially toward the first light source 20. The second recesses 2222 are arranged at intersections of the first grid lines 23 and the third grid lines 25. Each second recess 2222 defines a second slant (not labeled) facing substantially toward the second light source 21. Referring to FIG. 7 and FIG. 8, the backlight module 2 can provide substantially uniform output light with high brightness over a desired range of emission angles closest to the perpendicular (0°), as has been demonstrated by experimental simulations. In other respects, the backlight module 2 has advantages similar to those described above in relation to the backlight module 1.

Figure 9:
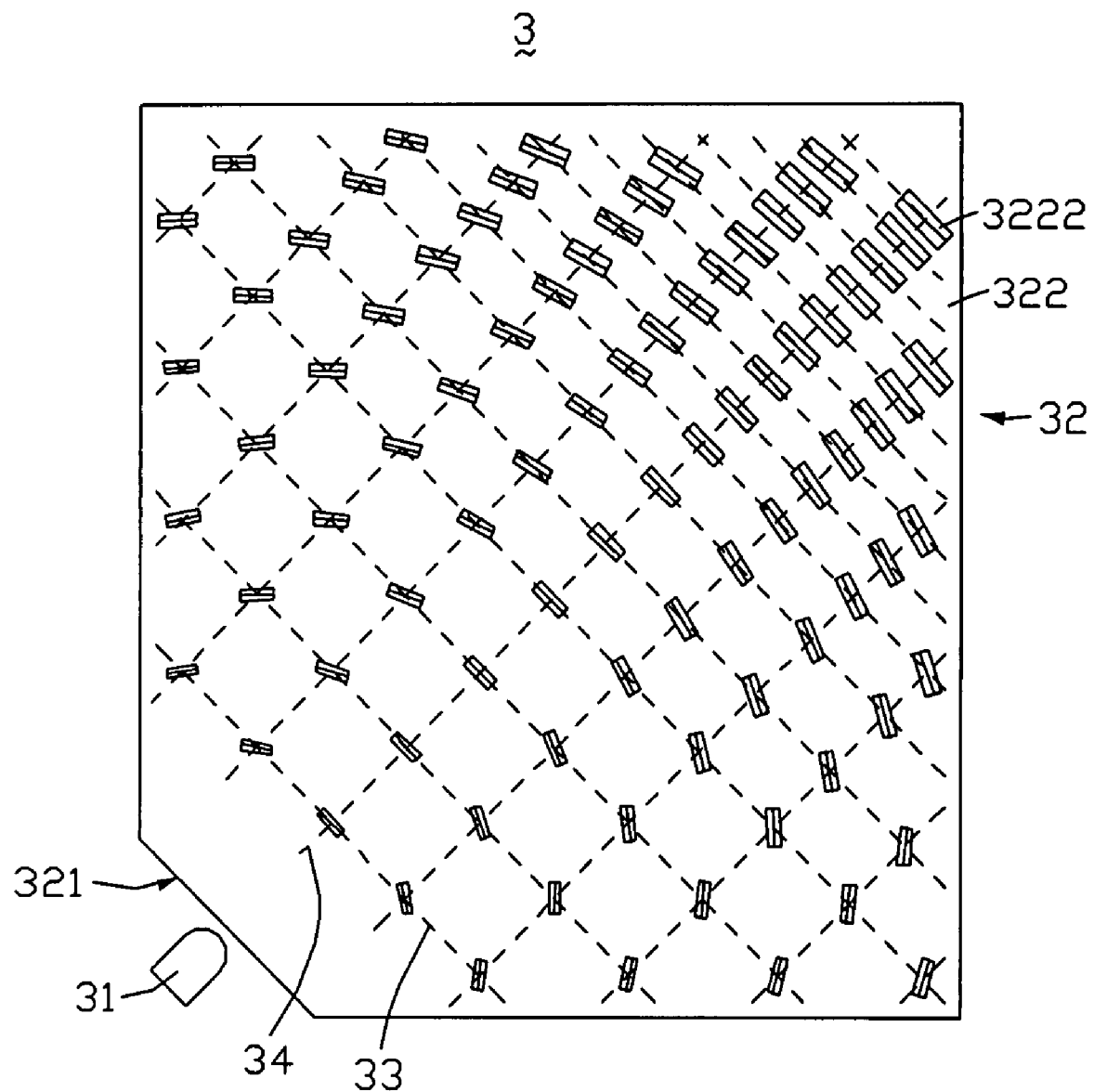
FIG. 9 is a bottom plan view of a backlight module according to a third embodiment of the present invention.

Referring to FIG. 9, a backlight module 3 according to a third embodiment of the present invention is similar in principle to the backlight module 1. However, the backlight module 3 includes a light source 31 and a light guide plate 32. The light guide plate 32 is essentially rectangular, except that one corner (not labeled) of the light guide plate 32 is cut, thereby defining an oblique light incident surface 321. The light guide plate 32 includes the light incident surface 321, and a bottom surface 322 perpendicularly adjoining the light incident surface 321.

The bottom surface 322 defines an imaginary grid. The grid includes a plurality of imaginary first grid lines 33 that are parallel to each other and parallel to the light incident surface 321, and a plurality of imaginary second grid lines 34 that are parallel to each other and perpendicular to the light incident surface 321. The bottom surface 322 further defines a plurality of recesses 3222 arranged at intersections of the first and second grid lines 33, 34. Each recess 3222 defines a slant (not labeled) facing substantially toward the light source 31. The backlight module 3 has advantages similar to those described above in relation to the backlight module 1.

Figure 10:
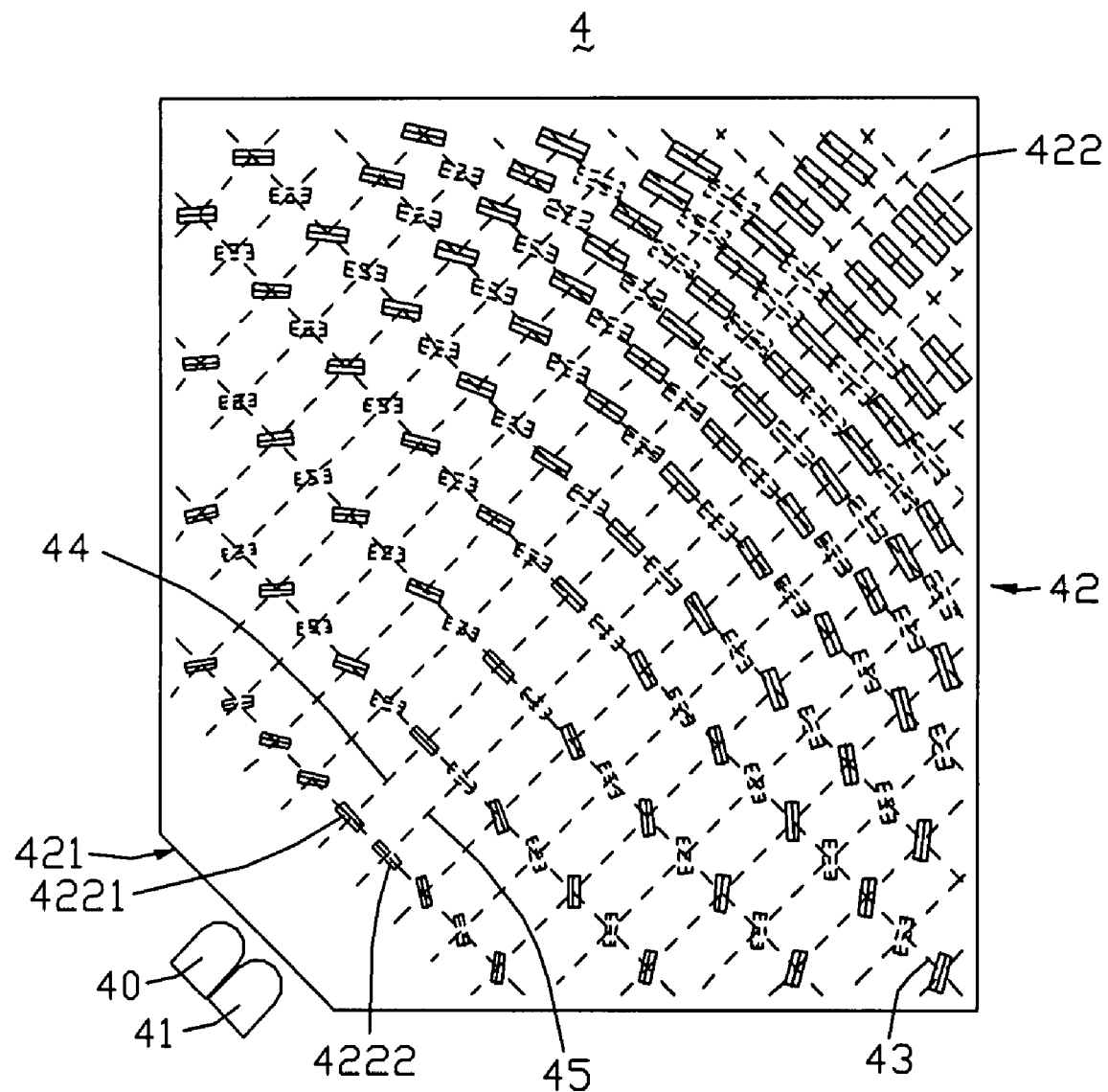
FIG. 10 is a bottom plan view of a backlight module according to a fourth embodiment of the present invention.
Figure 11:
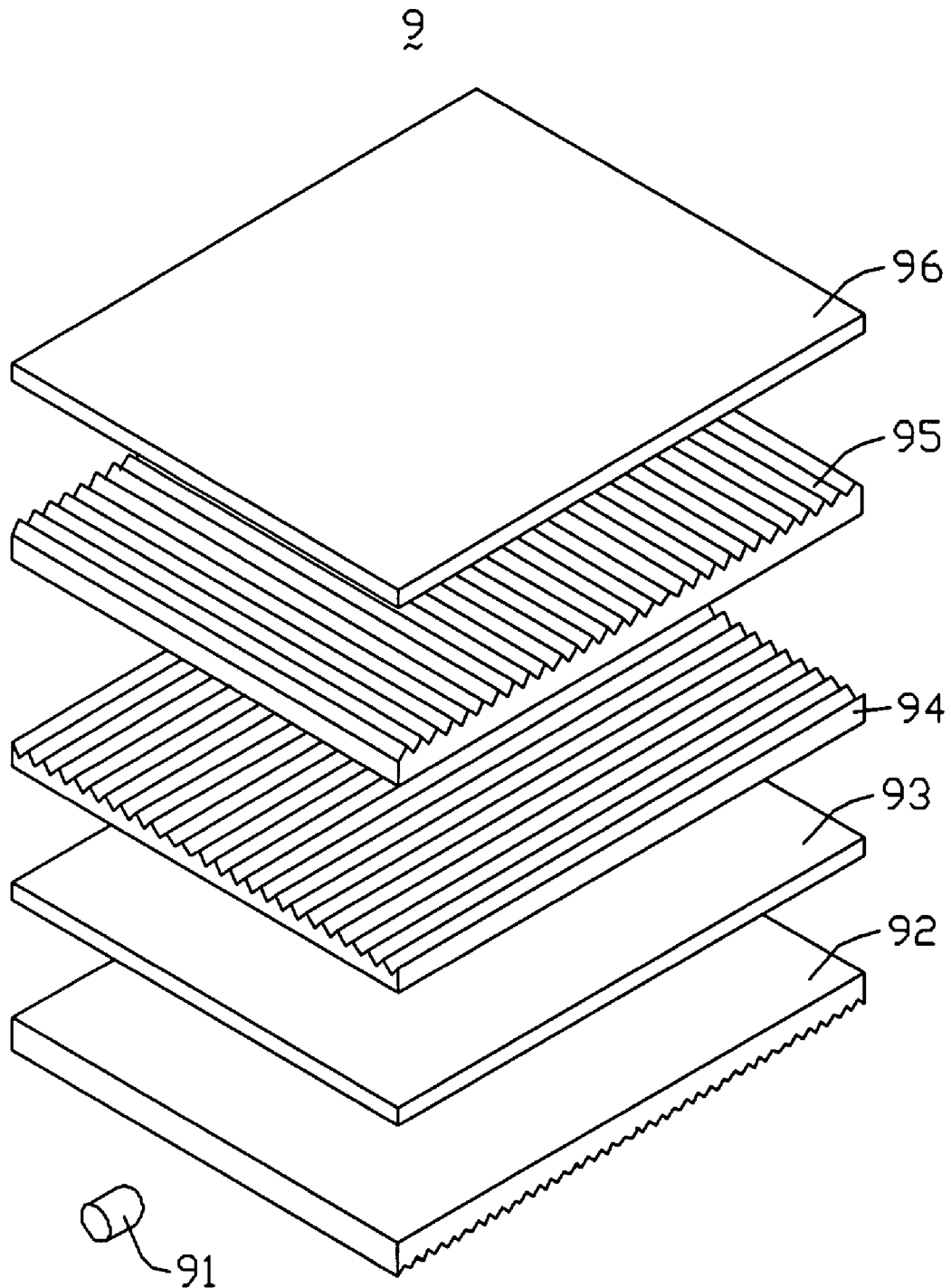
FIG. 11 is an exploded, isometric view of a conventional backlight module, the backlight module including a light guide plate having a bottom surface, the bottom surface defining a plurality of grooves.
Figure 12:
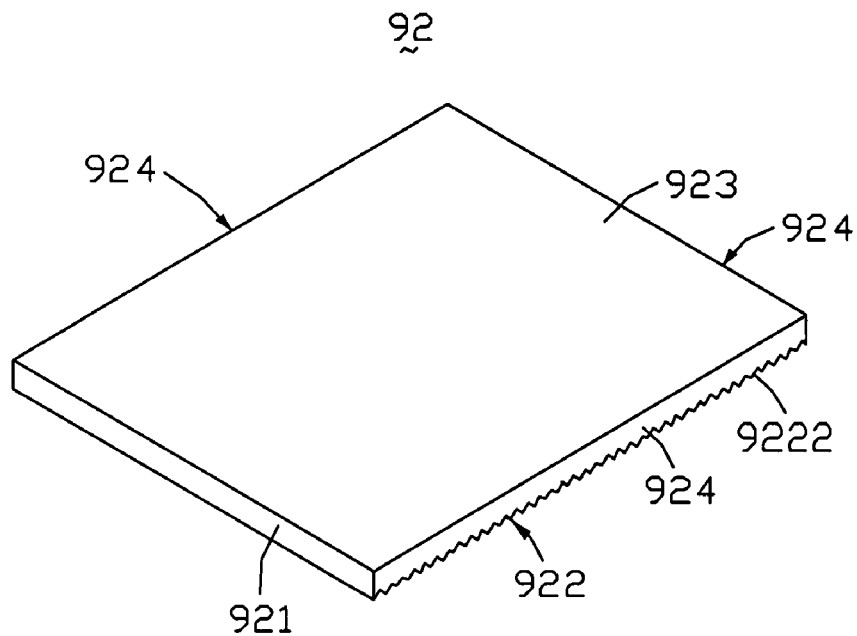
FIG. 12 is a view of the light guide plate of FIG. 1 shown in isolation.
Figure 13:
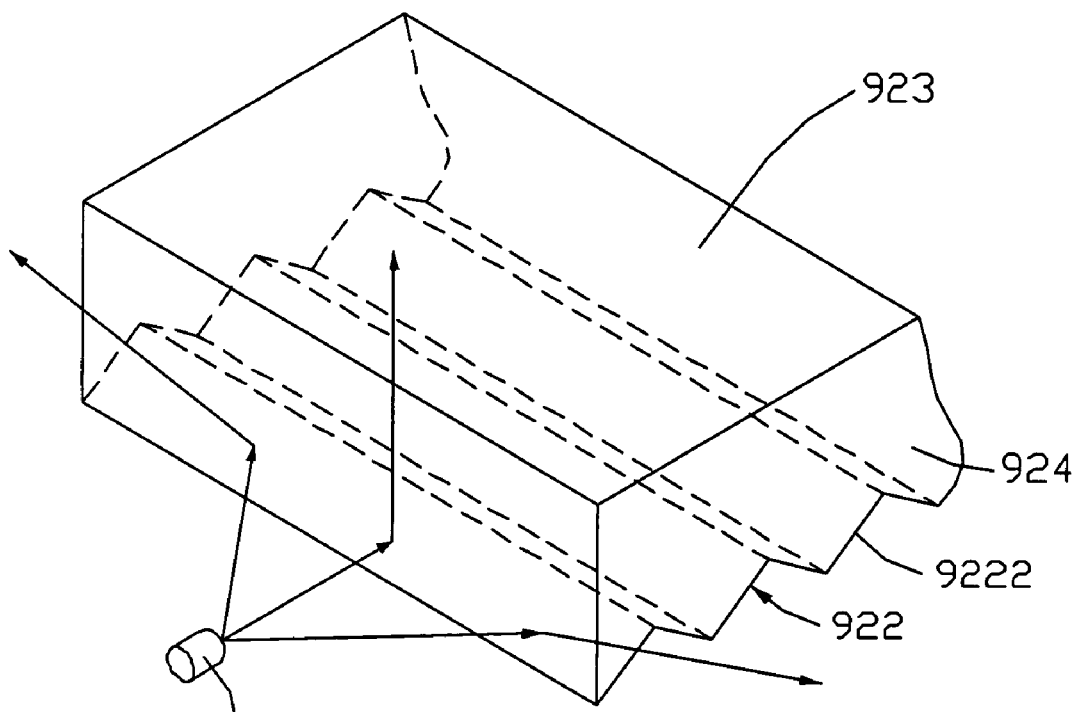
FIG. 13 is an enlarged view of part of the backlight module of FIG. 1, showing essential optical paths of the light guide plate.

Referring to FIG. 10, a backlight module 4 according to a fourth embodiment of the present invention is similar to the backlight module 3. However, the backlight module 4 includes a first light source 40, a second light source 41, and a light guide plate 42. The two light sources 40, 41 are disposed adjacent to a light incident surface 421 of the light guide plate 42. A bottom surface 422 of the light guide plate 42 defines a plurality of first recesses 4221 and a plurality of second recesses 4222.

The bottom surface 422 also defines an imaginary grid. The grid includes a plurality of imaginary first grid lines 43, a plurality of imaginary second grid lines 44, and a plurality of imaginary third grid lines 45. The first grid lines 43 are parallel to each other and parallel to the light incident surface 421. The second grid lines 44 are parallel to each other and orthogonal to the light incident surface 421. The third grid lines 45 are parallel to each other and are parallel to the second grid lines 44. The second grid lines 44 and the third grid lines 45 are arranged alternately.

The first recesses 4221 are arranged at intersections of the first and the second grid lines 43, 44. The second recesses 4222 are arranged at intersections of the first and the third grid lines 43, 45. Each first recess 4221 defines a first slant (not labeled) facing substantially toward the first light source 40. Each second recess 4222 defines a second slant (not labeled) facing substantially toward the second light source 41. The backlight module 4 has advantages similar to those described above in relation to the backlight module 3.

Further or alternative embodiments may include the following. In one example, the recesses 1222, 2221, 2222, 3222, 4221, 4222 can define other cross-sectional profiles, so long as each recess 1222, 2221, 2222, 3222, 4221, 4222 defines a slant facing substantially toward a corresponding light source. In another example, a backlight module can have three or more point light sources and three or more corresponding groups of recesses. In such case, each group of recesses corresponds to a respective light source, and the slants of each recess in the group of recesses face substantially toward the corresponding point light source.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
a first light source,
a second light source, and
a light guide plate, comprising:
a light incident surface, the two light sources positioned adjacent to the light incident surface, and
a bottom surface adjacent to the light incident surface, the bottom surface defining a plurality of first recesses arranged in a first matrix and a plurality of second recesses arranged in a second matrix, the two matrixes defined by a plurality of imaginary grid lines at the bottom surface, the imaginary grid lines comprising a plurality of first imaginary grid lines parallel to each other and extending along a first direction, a plurality of second imaginary grid lines parallel to each other and extending along a second direction orthogonal to the first direction, and a plurality of third imaginary grid lines parallel to each other and extending along the second direction, the second imaginary grid lines and the third imaginary grid lines being arranged alternately, each first recess defining a first slant and a first arris at a top of the first slant, the first arris of the first slant at each first recess being aligned substantially perpendicular to a main path of light beams that propagate from the first light source to the first recess, each second recess defining a second slant and a second arris at a top of the second slant, the second arris of the second slant at each second recess being aligned substantially perpendicular to a main path of light beams that propagate from the second light source to the second recess,
wherein lengths of the first arrises of the first recesses and the second recesses in the same first imaginary grid line are the same, lengths of the first arrises of the first recesses in the same second imaginary grid line progressively increase with increasing distance away from the first light source, lengths of the second arrises of the second recesses in the same third imaginary grid line progressively increase with increasing distance away from the second light source, the first recesses are arranged at intersections of the first imaginary grid lines and the second imaginary grid lines, and the second recesses are arranged at intersections of the first imaginary grid lines and the third imaginary grid lines.

2. The backlight module as claimed in claim 1, wherein the first direction is parallel to the light incident surface, and the second direction is perpendicular to the light incident surface.

3. The backlight module as claimed in claim 2, wherein a pitch between each two adjacent first imaginary grid lines progressively decreases with increasing distance away from the light source.

4. The backlight module as claimed in claim 1, wherein each first recess defines an isosceles triangular profile, with the first recess maintaining a pair of base angles relative to the bottom surface, each base angle being in the range from 45° to 55°, and each second recess defines an isosceles triangular profile, with the second recess maintaining a pair of base angles relative to the bottom surface, each base angle being in the range from 45° to 55°.

5. The backlight module as claimed in claim 1, wherein the light guide plate is essentially pentagonal, with a shortest side of the light guide plate that is oblique to the other four sides of the light guide plate forming the light incident surface.

* * * * *